United States Patent [19]
Lehde, Jr. et al.

[11] 3,819,195
[45] June 25, 1974

[54] COLLET CONSTRUCTION
[75] Inventors: John W. Lehde, Jr., Chicago, Ill.;
Prabodh M. Vora, Gujarat, India
[73] Assignee: The Bendix Corporation, Southfield, Mich.
[22] Filed: June 7, 1972
[21] Appl. No.: 260,564

[52] U.S. Cl. .................................................. 279/46
[51] Int. Cl. ........................................... B23b 31/20
[58] Field of Search ............ 279/46, 47, 48, 49, 50, 279/51, 52, 53, 54

[56] References Cited
UNITED STATES PATENTS
1,917,752  7/1933  Connell ............................... 279/53

Primary Examiner—Francis S. Husar
Attorney, Agent, or Firm—John R. Benefiel

[57] ABSTRACT

A collet construction is described for split sleeve, single angle, outside taper straight bore type collets which provides a more nearly uniform closing action over a range of bore diameters for collet sizes such that the gripping length is less than the full length of the collet. This construction involves locating both the front and rear sets of ties joining the slots within the gripping length of the collet as long as the flexibility requirements allow, and in situations in which such a configuration is impractical due to a resulting excessively stiff collet, a tapered relief on the collet O.D. is provided which creates an even closing rate despite the fact the ties are not all located within the collet gripping length.

4 Claims, 11 Drawing Figures

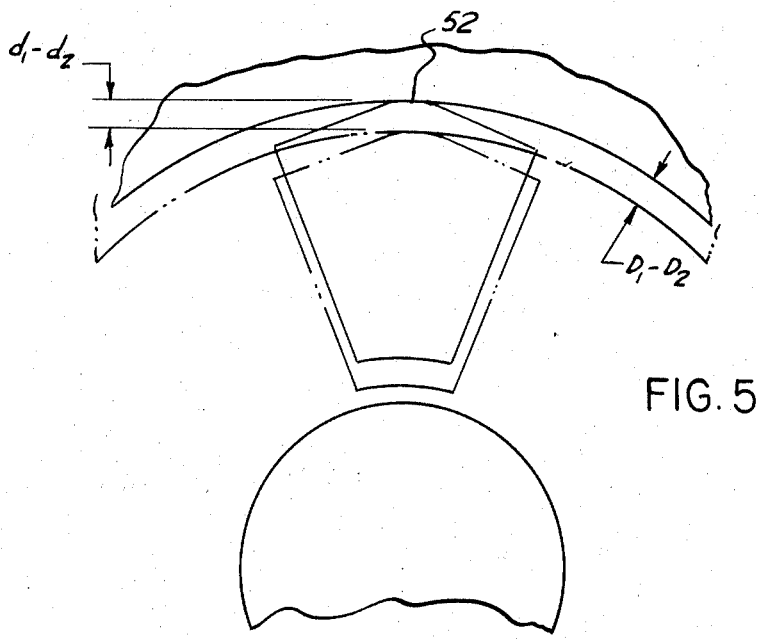
FIG. 5
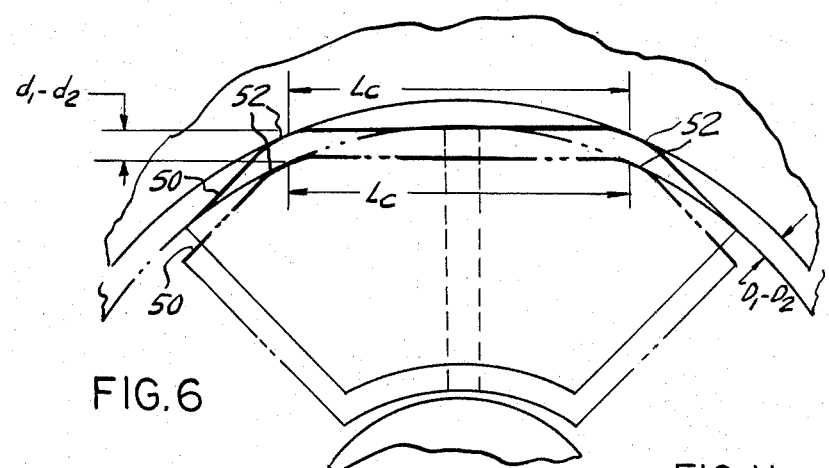
FIG. 6
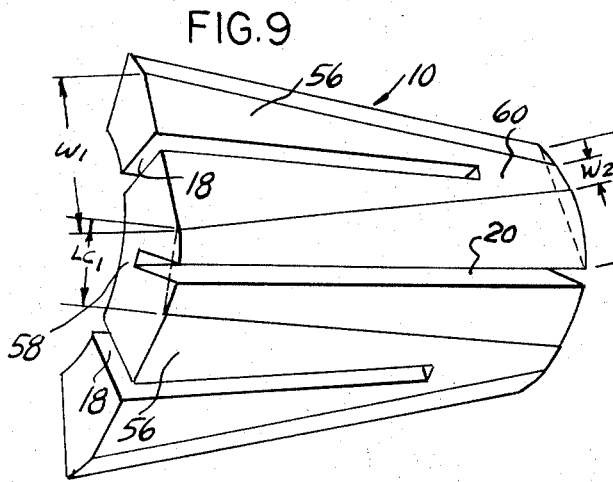
FIG. 9
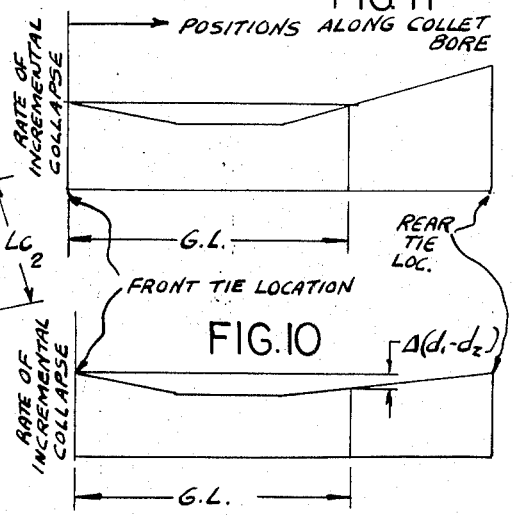
FIG. 11
FIG. 10

COLLET CONSTRUCTION

BACKGROUND OF THE INVENTION

1. Field of the Invention

This invention concerns collets, and more particularly split sleeve, single angle, outside taper, straight bore type collets which are designed to grip a selected range of tool shank diameters.

2. Description of the Prior Art

Split sleeve collets of the type in which a slotted, tapered sleeve having a straight internal bore formed therein is forced into a tapered bore in a holder to cause contraction of the straight bore and so to grip the tool shank have long been known.

While it would be advantageous if such collets could be utilized over a range of diameters so as to reduce the number of collets needed for a given range of shank sizes, certain problems are encountered in attempting to do this which have resulted in uneven gripping of the tool shank, as diameters vary, leading to increased runout and decreased holding forces. Modern day machining operations and materials, particularly the increasingly common numerically controlled machining centers have particularly severe accuracy requirements in this area, and thus for many such applications such limited range collets have not been suitable and due to the large number of single purpose collets which would be required to be inventoried to accommodate an entire range of shank sizes, this type collet has not been feasible for this application. These problems have been particularly severe with collets for very small diameter drill sizes where the much shorter drill length occupies only a portion of the collet straight bore.

Some of the factors causing this problem have been correctly identified and corrected in the past, as will be discussed in detail infra, but certain other factors have heretofore remained uncorrected, specifically in the shorter gripping length drill sizes.

Therefore it is an object of the present invention to provide a collet construction for the type of collet described which is capable of accepting a selected range of shank sizes without resulting in uneven gripping thereof.

SUMMARY OF THE INVENTION

This and other objects which will become apparent upon a reading of the following specification and claims are accomplished by locating the ties within the gripping length and providing a reduced arc contact on the segments of the collet between the slots for sizes in which the tool shank length is less than that of the collet bore length. For smaller sizes in which this is impossible due to flexibility requirements, a tapered O.D. relief is formed on the collet to compensate for the uneven closing which would normally occur as a result of one of the sets of ties being located out of the gripping length to provide the necessary collet flexibility and the even closing in these smaller shank sizes.

DESCRIPTION OF THE DRAWINGS

FIG. 5 is a diagrammatic representation of a modified split sleeve collet O.D. and holder bore I.D. relationship with one of the eight (8) segment sections of the collet shown in FIG. 3.

FIG. 6 is a diagrammatic representation of a split sleeve collet O.D. and holder bore I.D. relationship with a form segment section of the collet formed by the tie sections connecting four (4) of the collet slots.

FIG. 9 is a fragmentary perspective view of a collet showing the tapering relief provided to produce even closing of the collet shown in FIGS. 7 and 8.

FIG. 10 is a graphical representation of the closing rate of the collet shown in FIG. 8 without the corrective relief according to the present invention.

FIG. 11 is a graphical representation of the closing rate of the collet shown in FIG. 8 with the corrective relief according to the present invention.

DETAILED DESCRIPTION

Figure 1:
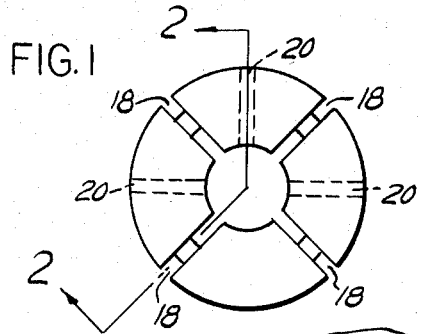
FIG. 1 is an end view of a collet constructed according to the present invention.
Figure 2:
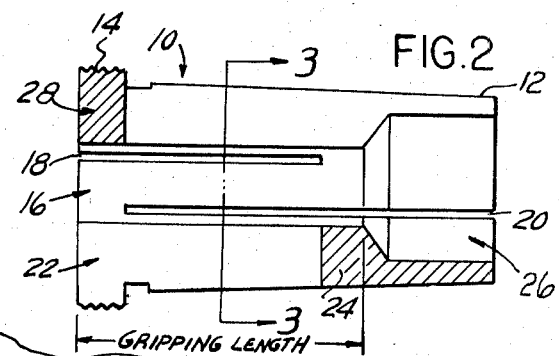
FIG. 2 is a view of the Section 2—2 taken in FIG. 1.
Figure 4:
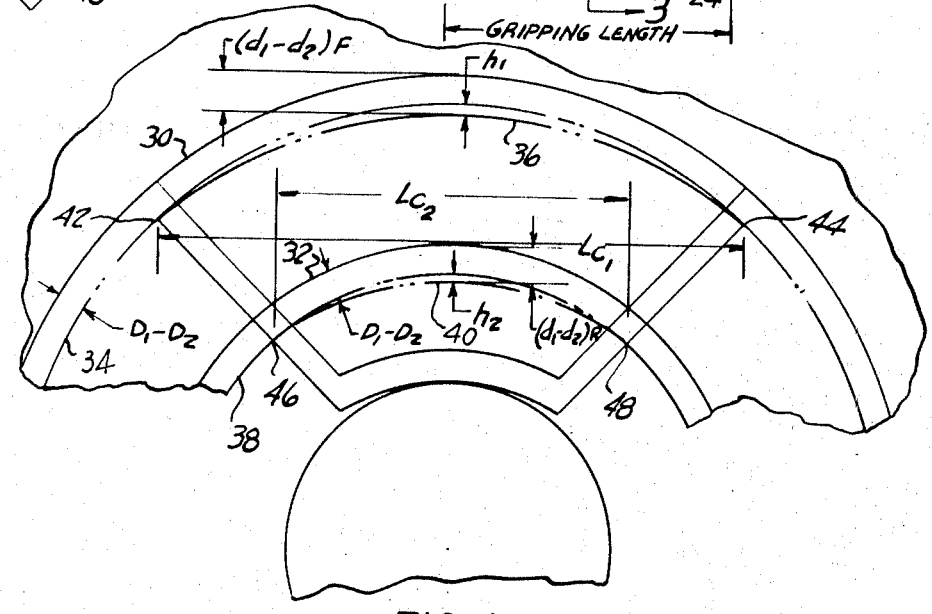
FIG. 4 is a diagrammatic representation of a split sleeve collet O.D. and holder bore I.D. relationship at the front and rear of the collet at the collet and holder bore matching position and at an advanced position in which the collet is advanced into the holder bore beyond the matching position, shown greatly exaggerated for clarity.
Figure 3:
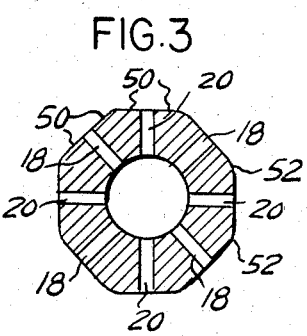
FIG. 3 is a view of the Section 3—3 taken in FIG. 2.

Before describing the novel aspects of the collet 10 shown in FIGS. 1–3, explanation of certain problems encountered in this type of collet will be here included with reference to the collet 10 depicted therein, and with the aid of the diagrammatic representations of FIGS. 4–6 in order to better understand the present invention.

The collet 10 is a split sleeve, single angle, outside taper, straight bore, type collet which is well-known in the art. This collet is used in conjunction with a holder (not shown) having a bore tapered to cooperate with the tapering O.D. 12 of the collet 10. The collet 10 is forced into the tapered holder bore by means of a nut (not shown) cooperating with a threaded portion on the collet in the manner well-known in the art.

As collet collect 10 is advanced into the holder bore it reaches a "matching" position in which the tapered bore and collet O.D. just match each other, while further advance from this point causes contraction of the collet 10. This contraction results in a collapse of the collet 10 straight bore 16 because of the provision of two sets of slots 18 and 20, slots 18 being directly axially from the front 22 of the collet 10 to a solid tie section 24 towards the rear 26 of the collet 10, and slot set 20 being directed axially from the rear to solid tie section 28 at the front 22.

This collapse is utilized to grip a tool shank in the bore 16 in the manner well-known in the art.

This basic collet construction is subject to a certain problem in that the nature of this arrangement, if unmodified, inherently leads to an uneven collapse of the bore 16, the front tending to collapse faster than the rear to result in gripping of the tool shank at the front only, resulting in drastically decreased holding forces and increased runout. This becomes more aggravated as the extent of collapse increases so that an accurate extended range collet would be precluded.

Referring to FIG. 4, the cause of this problem results from the fact that when the collet 10 is pushed beyond its matching position, contact between the holder bore and each segment of the collet O.D. is at a pair of spaced points which are the slot corners of the slots which define each collet segment.

In this diagram, the solid arcs 30 and 32 represent the holder bore and collet O.D. at the matching position with the larger arc representing the collect O.D. and holder bore at the front or larger end thereof and the smaller arc representing the collet O.D. and holder bore at the rear or smaller end thereof.

In phantom lines, the arc 34 represents a holder bore section at the point to which the collet O.D. depicted by arc 30 has been advanced to after a certain limited axial movement of the collet beyond the matching position, while the arc 36 represents the collet O.D. in its new position and depicts its relationship to the holder bore after this limited axial movement.

Also in phantom lines the arc 38 represents the holder bore section at the point to which the collet O.D. depicted by the arc 32 has been advanced after the same limited axial movement of the collet referred to has taken place. Arc 40 represents the collet O.D. in its new position and depicts its new relationship with the holder bore.

As here seen in the advanced position contact at the front is at points 42 and 44 forming a "chordal" contact, with the lengths of this chord equal to $L_{c1}$, while the contact at the rear being at points 46 and 48 to also provide a chordal contact, the length of this chord being $L_{c2}$, with $L_{c1}$ being greater than $L_{c2}$. While a given axial shift of the collet shows a uniform reduction within the holder bore $D_1 - D_2$ at all points along the collet length (assuming the holder bore taper is constant), the amount of collapse of the collet segment is greater by the clearance distances $h_1$ and $h_2$ which are developed as the collet is pushed beyond the matching position; to result in a collet internal bore collapse of $(d_1 - d_2) F = (D_1 - D_2) + h_1$ at the front and $(d_1 - d_2) R = (D_1 - D_2) + h_2$ at the rear. The nature of the chordal contacts are such that the distance $h_1$ is greater than $h_2$ since the different chordal lengths $L_{c1}$ and $L_{c2}$ are involved and from the inherent geometry of the situation the net result is a faster closing or collet collapse at the front than the rear. It is noted that the geometry depicted in FIG. 4 is greatly exaggerated in order to show more clearly the various relationship and effects. In order to eliminate this problem, it is well known to perform O.D. relief grinding on the collet which usually takes the form of a series of flats 50 (FIG. 3) or arcuate clearances ground down the length of the collet O.D. central to each slot of slot sets 18 and 20. This expedient produces a line or minimum arc contact along the high spots 52 left by this process to eliminate the chordal contact differences described above.

This can be appreciated by reference to FIG. 5, which demonstrates that for a given incremental reduction of the holder bore diameter $D_1 - D_2$ experienced by a given collet O.D. section as it is advanced into the holder bore a corresponding collapse $d_1 - d_2$ of the collet segment depicted in the collapsed position in phantom lines occurs just equal to the incremental reduction $D_1 - D_2$ and would be the same for every section of collet D.D., to thus theoretically produce the desired even collapse of the internal bore 16.

While this arrangement will correct the problem caused by chordal contact, it has been found that for smaller bore sizes with reduced gripping length uneven closing is still encountered notwithstanding this correction of relief grinding the collet O.D.

This uneven closing, it has been found by the present inventors, can be traced to the tie location and is caused for the most part by the location of one of the sets of ties out of the gripping length of the internal bore.

It should be noted that for tools such as standard drills, the length of the collet used for gripping the tool shank is lessened as the diameter of the drill is reduced since the shank length of standard drills is reduced with the drill diameter. Since the collets for the entire range of shank sizes are of the same size and length externally since they are used with a common holder size, this results in a less than full length internal bore being used for gripping the tool. It should also be noted that the standard practice is to locate the ties at the extreme front and rear of the collet, so that for collets designed to handle these shorter tool lengths, the rear ties are located out of the gripping length.

The significance of these factors can be understood by reference to FIG. 6.

An effect of the tie sections on the response of the collet as it is compressed, is to restrain the independent collapse of each collet segment, since independent collapse of these segments necessarily involves a certain amount of circumferential contraction afforded by the slots in slot sets 18 and 20, and the ties tend to restrain such contraction or entirely preclude it depending on the precise location of the ties.

This effect thus has a tendency to recreate the chordal contact in the vicinity of the ties and by creating a four-segment collet in the vicinity of the ties while an eight-segment collet in effect exists between the front and rear tie sets.

If circumferential contraction is entirely precluded, a chordal contact of length $L_c$ is created defined by the contact points of adjacent collet segments and the holder bore. It can be seen that as the collet is advanced inwardly to produce a holder bore diameter reduction at each collet section equal to $D_1 - D_2$, a somewhat greater internal bore collapse $d_1 - d_2$ is created because of the inherent geometry of the situation as described above, notwithstanding the relief flats 50.

Accordingly, the collet will collapse somewhat faster in the vicinity of the ties than in the region between the ties since in this region line contact and independent collapse can there occur to create a slight "barreling" of the collapse within the bore diameter. It can thus be seen that in the situation where the rear set of ties is located out of the gripping length, the tendency will be to grip the tool only on the front end thereof.

In order to correct this situation, the collet 10 according to the present invention is contructed with the tie extending inwardly from the rear to be within the gripping length of bore 16, so that the effect noted is minimized and the tool shank will be gripped at both the front and rear by an effectively four-segment portion of the collet 10.

In addition, the radial location also has some effect but is less significant and by itself could be compensated for by the proper axial tie location and tie length ratios front to back.

In connection with this point, it is noted that the "tie length ratio" or the ratio of the length front and rear ties is often relied on to adjust the closing rate of the front and rear of the collet since the collapse rate at a given location along the collet length is controlled to a certain extent by the axial length from the given location to the beginning of the respective slots, in turn controlled by the tie length. This design technique is known in the art and is related in principle to deflections along a cantilevered beam. However, the variations in collapse rate produced by these adjustments vary as a linear function with axial length while those variations in collapse rates produced by the differences in chordal contact length are varied as an exponential function. Accordingly, this difference in collapse rates front and rear for many collect sizes have been found to be uncorrectable by conventional adjustment of the tie length ratios.

These various effects can be analyzed mathematically, but in arriving at a final design it may be necessary to take other factors into consideration and by some trial and error obtain an acceptable design for a uniformly closing collet. The major consideration however according to this aspect of the present invention is locating the ties, where possible, within the gripping length as the effect of not so locating them is the major source of uneven bore collapse.

It can be appreciated that extending the rear ties axially towards the front makes the collet stiffer in compression, since the "beam" formed by the slots associated with these ties becomes shortened thereby. As the gripping length becomes shorter, flexibility of the collet may decrease to the point that unacceptable force levels are required to collapse the collet.

In this situation of small bore, short gripping length collets, the approach described above is not feasible, and hence an alternative novel solution is here described with reference to FIGS. 7–11.

Figure 7:
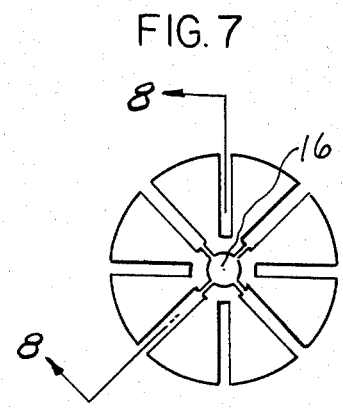
FIG. 7 is an end view of a collet constructed according to a second embodiment of the invention.
Figure 8:
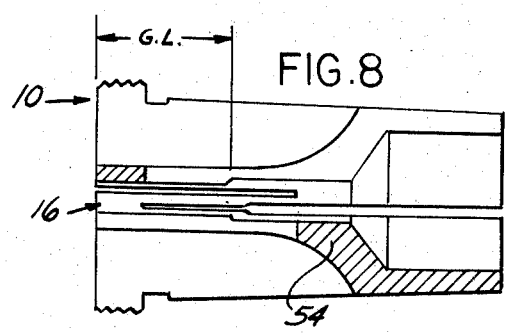
FIG. 8 is a view of the Section 8—8 taken in FIG. 7.

FIGS. 7 and 8 show a collet wherein the gripping length G.L. is a minor portion of the overall collet length and is a typical configuration wherein the rear ties 54 must be located well out of the gripping length in order to meet the flexibility requirements described.

To correct the resulting uneven closing which would normally occur, a tapering relief is provided according to the present invention in order to provide a controlled collapse such that the error factors are nullified. The nature of these tapering relief flats can be understood by reference to FIG. 9 which depicts a collet 10 with portions omitted for clarity and having tapering relief flats 56 formed therein which are central to the slots of the front slot set 18 and which proceed from a relatively wide width $W_1$ at the front of the collet to a relatively narrow width $W_2$ at the rear of the collet This effectively produces contact points of the collet segments defined by the front slots 18 in the vicinity of the front ties 58 thereof of a much smaller chordal length $L_{c1}$ than the chordal length $L_{c2}$ of the contact points of the collet segments defined by the rear slot set 20 in the vicinity of the rear ties 60, since the front segments are greatly relieved by the flats 56 while the rear collet segments are essentially unrelieved to produce contact over the full arc of the rear segments.

This difference in chordal lengths is the opposite of that which results from taper of the collet O.D. itself described in conjunction with FIG. 4, and the opposite result occurs: the segments in the vicinity of the front ties 58 now are collapsed substantially less for a given incremental advance of the collet into the holder bore than the collapse in the vicinity of the rear ties 60 as will be apparent from the discussion above.

The utility of this effect can be understood by reference to FIGS. 10 and 11. FIG. 10 diagrams the results of having the rear ties out of the gripping length; i.e., the collapse at the front and rear ties is greater than the region in between, which leads to the result that at the rear of the gripping length, a lesser collapse of the bore occurs than at the front, shown diagrammatically as $\Delta d_1 - d_2$ in FIG. 10, which effect has been described at length above.

FIG. 11 shows the collapse rate along the collet with the tapering reliefs 56, is much greater in the vicinity of the rear ties 60 than that in the vicinity of the front ties 58, the net result being that the collapse at the rear of the gripping length is the same as that in the vicinity of the front ties 58 to thus insure secure gripping of the tool shank at the front and rear of the shank.

The precise degree of taper selected depends on the relative influence of the various factors described and the most feasible approach is to select an initial design based on a consideration of these and the various geometrical relationships and refine it by trial and error to arrive at a final design of acceptable uniformity in collapse at the front and rear of the gripping length.

From this description it should be appreciated that a collet construction has been provided which provides uniform closing over a range of gripped diameters at the front and rear of the gripping length of a collet of the type described in situations where the gripping length is less than the collet length, even for situations where the gripping length is very short in comparison to the collet length, without compromising normal flexibility requirements or excessively increasing manufacturing costs.

Many variations are of course possible within the scope of the present invention as for example the precise geometry of the reliefs shown in FIG. 9 can be varied a great deal as long as the chordal contact relationship is such that the necessary collapse rate is obtained. It is also possible to selectively close the back of gripping length faster than the front to compensate for the back taper normally found on standard drill shanks if desired.

Thus, in the above detailed description certain specific terminology was utilized for the sake of clarity and a specific embodiment was described in order to provide a complete understanding of the invention, but it is to be understood that the invention is not so limited and may be practiced in a variety of forms and embodiments.

Therefore, what is claimed is:

1. An improved collet construction for the tapered outside diameter sleeve type of collet having an internal bore for gripping of the member to be held and having a first set of axially directed slots and a first set of ties associated therewith at the larger outside diameter end of said collet connecting together the collet segments created by said first slot set, and a second set of axially directed slots oppositely directed to said first slot set and a second set of ties associated therewith at the smaller outside diameter end of said collet connecting together the collet segments defined by said second slot set, the improvement comprising:

relief surfaces formed on said collet outside diameter such that the chordal length between the contact points of said collet segments defined by said first slot set is smaller than the chordal length between the contact points of said collet segments defined by said second slot set.

2. The collet of claim 1 wherein said relief surfaces comprise relieved areas of said collet outside diameter located along said slots in said first slot set whereby said relieved areas relieve the collet segments defined by said first slot set and said collet segments defined by said second slot sets are unrelieved to thereby produce said difference in chordal lengths between respective contact points.

3. The collet of claim 1, wherein said internal bore includes a reduced diameter section providing a gripping bore of smaller length than the overall internal bore length, and wherein said difference in chordal length between said respective contact points produces an even collapse of said reduced diameter section at either end thereof for a given axial advance into a collet holder.

4. The collet of claim 1, wherein said relief surfaces comprise axially extending tapered flats central to said first slot set, said tapered flats having a wider width in the vicinity of said first tie set than in the vicinity of said second tie set.

* * * * *